United States Patent [19]

Kawada et al.

[11] Patent Number: 5,247,360
[45] Date of Patent: Sep. 21, 1993

[54] CONTOUR-EMPHASIZING APPARATUS IN TELEVISION CAMERA

[75] Inventors: Norihiko Kawada; Shoichi Ioka; Katsumi Degawa; Keiichi Fujishima, all of Tokyo, Japan

[73] Assignee: Ikegami Tsushinki Co., Ltd., Tokyo

[21] Appl. No.: 623,663

[22] PCT Filed: May 1, 1990

[86] PCT No.: PCT/JP90/00575
 § 371 Date: Dec. 28, 1990
 § 102(e) Date: Dec. 28, 1990

[87] PCT Pub. No.: WO90/13968
 PCT Pub. Date: Nov. 15, 1990

[30] Foreign Application Priority Data

Apr. 28, 1989 [JP] Japan .................................. 1-107754

[51] Int. Cl.⁵ .............................................. H04N 5/208
[52] U.S. Cl. .................................. 358/166; 358/168; 358/169; 358/163; 358/37
[58] Field of Search ............... 358/160, 168, 169, 163, 358/166, 37, 96

[56] References Cited

U.S. PATENT DOCUMENTS

| | | | |
|---|---|---|---|
| 4,415,920 | 11/1983 | Kato | 358/37 |
| 4,823,190 | 4/1989 | Yamamoto | 358/37 |
| 4,843,472 | 6/1989 | Shinada | 358/169 |

FOREIGN PATENT DOCUMENTS

| | | |
|---|---|---|
| 56-155566 | 11/1981 | Japan . |
| 58-31668 | 2/1983 | Japan . |
| 63-311875 | 12/1986 | Japan . |
| 62-299180 | 12/1987 | Japan . |
| 63-135091 | 6/1988 | Japan . |
| 1-132278 | 5/1989 | Japan . |
| 3-64169 | 3/1991 | Japan . |
| 4-10774 | 1/1992 | Japan . |

Primary Examiner—James J. Groody
Assistant Examiner—Sherrie Hsia

[57] ABSTRACT

A contour-emphasizing apparatus for a television camera includes a level correcting circuit for correcting an image signal non-linearly to the image signal level, so that the contour signal in a dark image region, is emphasized to a greater degree than to which the contour signal in a light image region is emphasized, to thereby produce a legible sharp image.

18 Claims, 4 Drawing Sheets

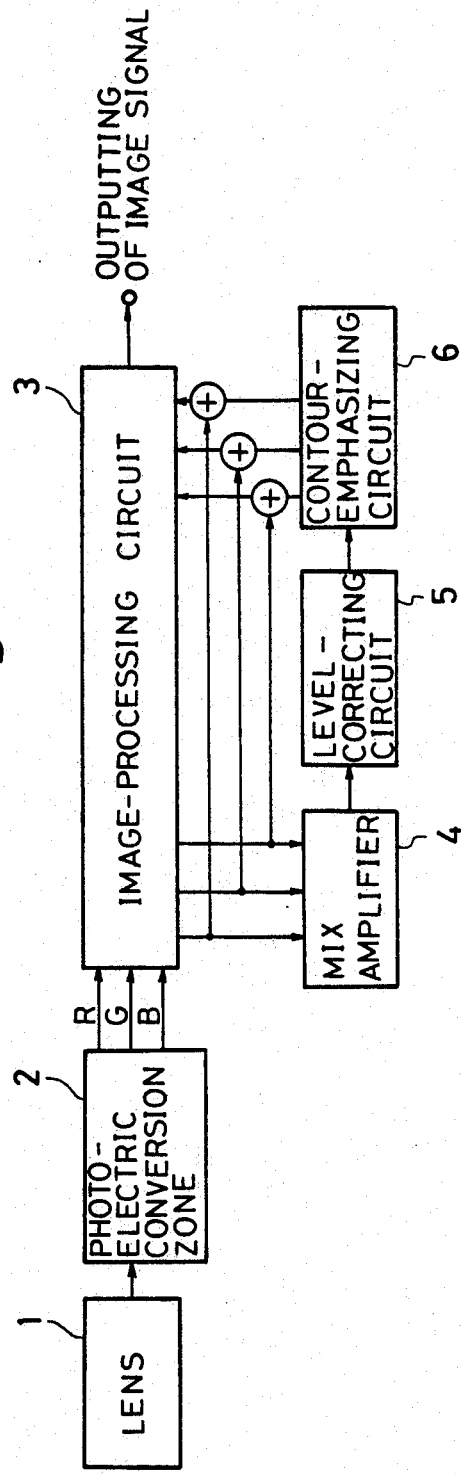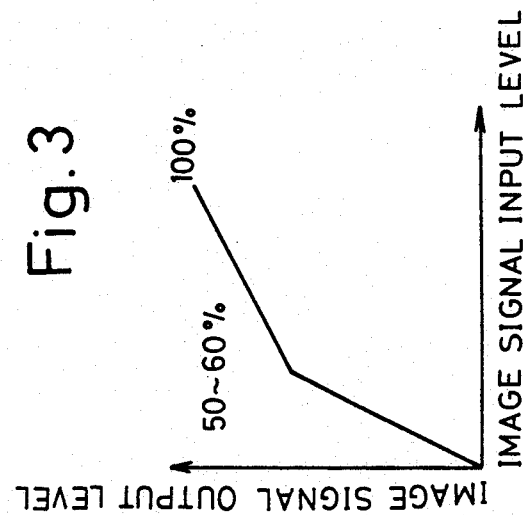

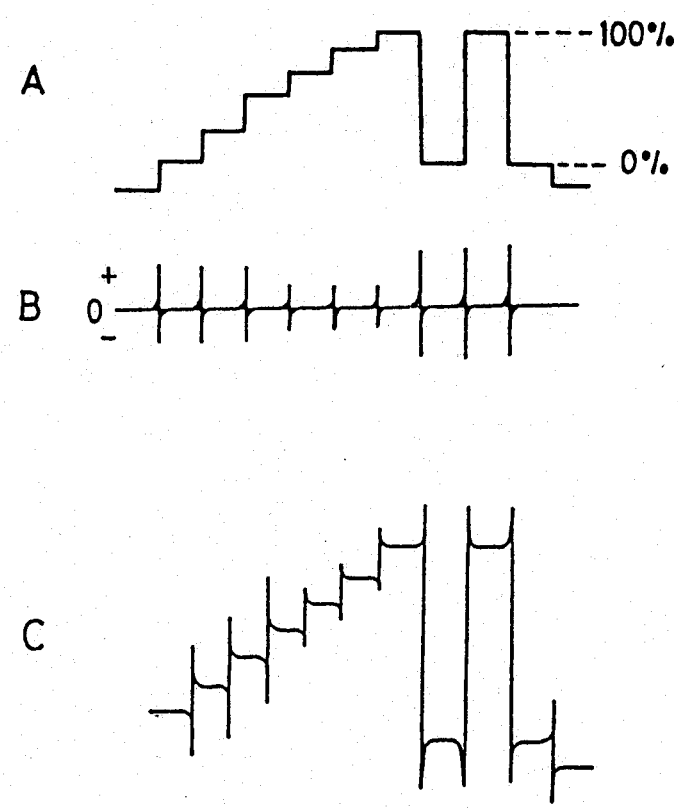

Fig. 5
(PRIOR ART) A 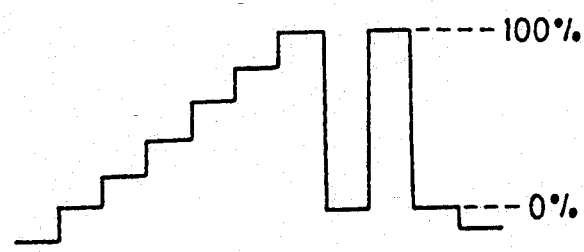
(PRIOR ART) B 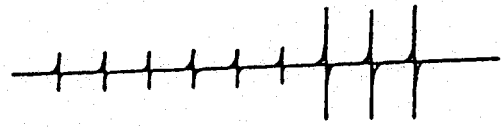
(PRIOR ART) C 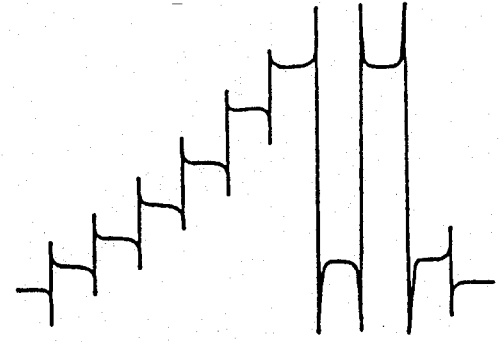

CONTOUR-EMPHASIZING APPARATUS IN TELEVISION CAMERA

TECHNICAL FIELD

The present invention relates to a contour-emphasizing apparatus disposed in a television camera.

TECHNICAL BACKGROUND

In order to increase the sharpness of an image of an object, a contour-emphasizing apparatus is generally built in a television camera. In this contour-emphasizing apparatus, as shown in FIG. 5A, an image signal [a luminance signal in case of a black-and-white television and a signal of three elementary colors (a signal formed by mixing signals R, G and B) in case of a color television] is differentiated to extract a contour signal as shown in FIG. 5B, and this contour signal is added to the original image signal [an R(red) signal., a G(green) signal and a B(blue) signal in case of a color television] to obtain a contour-emphasized image signal as shown in FIG. 5C.

In this conventional contour-emphasizing process, since the level of the contour signal is determined, as pointed out above, by the differential value of the level of the image signal, that is, the difference of the level between both the sides of the contour, not only in the bright region where the level of the image signal is high but also in the dark region where the level of the image signal is low, the level of the contour signal is the same if the difference of the level between both the sides of the contour is the same, and therefore, the contour-emphasizing degree is the same.

However, it is known that the visual resolving power of a man in the dark region is less than that in the bright region, and the contour-discriminating capacity in the dark region is poorer. Therefore, according to the above-mentioned contour-emphasizing process, the contour of the dark region is obscure and the image is illegible.

If the level of the contour-emphasizing signal is indiscriminately increased so as to clarify the contour of the dark region, the contour of the bright region is excessively emphasized and an image having striking streaks in the bright region is formed and also this image is illegible.

The present invention has been completed under this background, and it is a primary object of the present invention to provide a contour-emphasizing apparatus in a television camera, in which by correcting the level of an image signal before the emphasis of the contour, the contour is appropriately emphasized not only in the dark region but also in the bright region to increase the image quality.

DISCLOSURE OF THE INVENTION

In accordance with the present invention, there is provided a contour-emphasizing apparatus in a television camera, where a contour signal is extracted from an image signal and the contour signal is emphasized and corrected according to the signal level, said apparatus being characterized in that a level-correcting circuit for correcting the image signal non-linearly to the signal level and outputting the corrected signal to a contour-emphasizing circuit is interposed.

In the contour-emphasizing apparatus having this structure, the image signal is corrected by the level-correcting circuit so that the signal becomes non-linear to the signal level, and the corrected image signal is outputted. For example, in the dark region where the level of the image signal is low, the image signal is corrected with a relatively high gain and the corrected signal is outputted. In contrast, in the bright region where the level of the image signal is high, the image signal is corrected with a relatively low gain and the corrected signal is outputted.

Since the level of the image signal is thus increased even in the dark region, the contour-emphasizing degree is increased and an image having a high resolving power and a clear contour can be obtained.

BRIEF DESCRIPTION OF THE DRAWINGS

FIG. 1 is a block diagram illustrating the structure of an embodiment of the contour-emphasizing apparatus in a television camera according to the present invention.

FIG. 3 is a diagram illustrating the characteristics of the above-mentioned level-correcting circuit.

FIGS. 4A-4C are graphs showing waveforms of various signals obtained in the above embodiment of the apparatus of the present invention.

FIGS. 5A-5C are graphs showing waveforms of various signals obtained in the conventional contour-emphasizing apparatus.

EMBODIMENTS OF THE INVENTION

Figure 2:
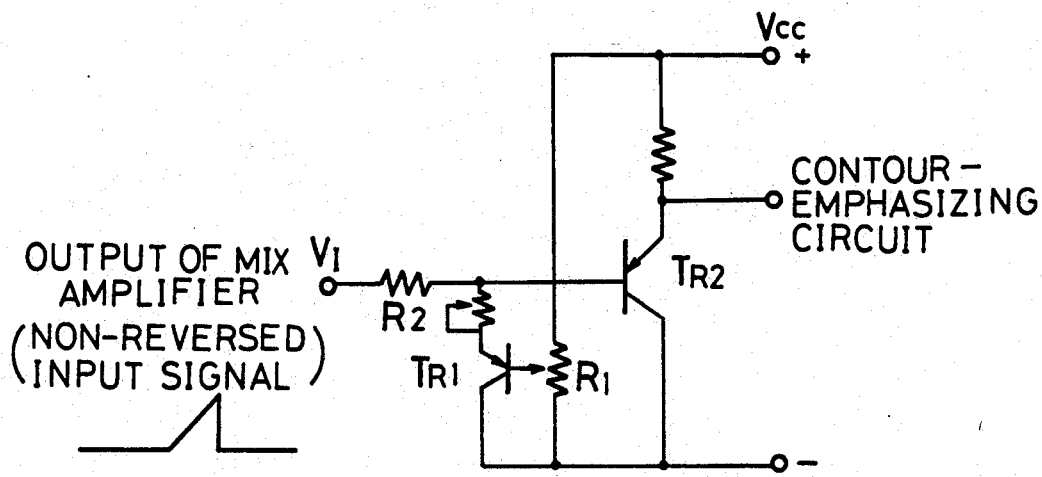
FIG. 2(A) is a circuit diagram illustrating an example of the level-correcting circuit used in the embodiment shown in FIG. 1.
FIG. 2(B) is a circuit diagram illustrating another example of the level-correcting circuit used in the embodiment shown in FIG. 1.
Figure 2:
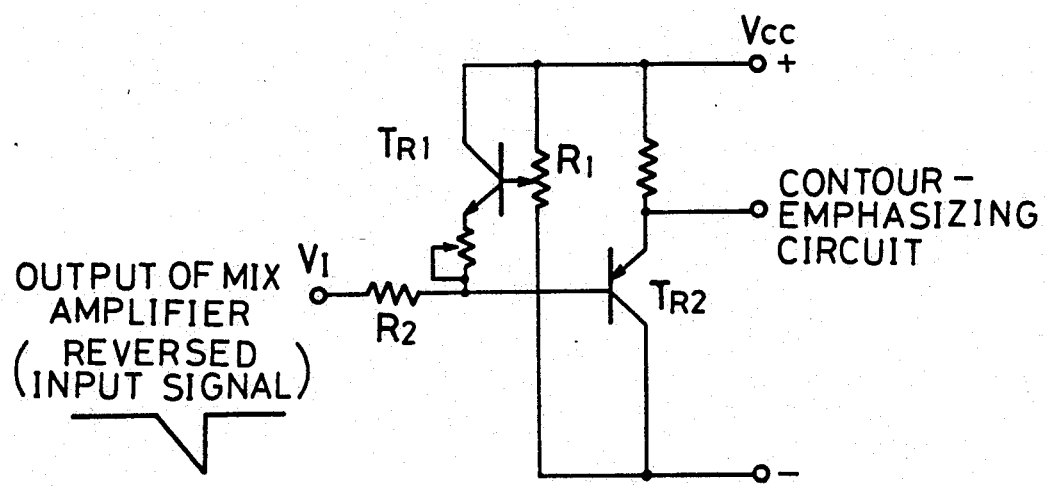

The embodiments of the present invention will now be described.

FIG. 1 shows the structure of one embodiment of the contour-emphasizing apparatus in a television camera according to the present invention.

Referring to FIG. 1, a light signal which has passed through a lens 1 of a color television camera is converted to an electric pick-up signal by a photoelectric conversion zone 2 comprising a pick-up element and the like and the electric pick-up signal is inputted into an image-processing circuit 3.

Three elementary color signals, that is, an R (red) signal, a G (green) signal and a B (blue) signal, formed by subjecting the pick-up signal to various correction processings are outputted from the image-processing circuit 3.

The outputted R signal, G signal and B signal are mixed in a MIX amplifier 4 and the formed image signal outputted from the MIX amplifier 4 is outputted into a contour emphasizing circuit 6 through a level-correcting circuit 5 of the present invention.

Contour-emphasized signals formed by the contour-emphasizing circuit 6 are added to the original R signal, G signal and B signal, respectively, and the addition signals are subjected to the image processing by an encoder and the like, and as the result, an image signal is outputted.

The level-correcting circuit 5 has, for example, a structure as shown in FIG. 2(A).

Referring to FIG. 2(A), in the case where the level of a non-reversed image signal inputted from the MIX amplifier 4 is higher than a predetermined value (for example, 50 to 60%), a transistor Tr1 is rendered conductive, and the image signal level of a base of an output transistor Tr2 is the value obtained by dividing the output V1 of the MIX amplifier 4 by the resistance of the transistor Tr1 and the resistance R2. The terminal voltage of the output transistor Tr2 which rises with elevation of the image signal of the above-mentioned base is outputted as the correction signal for the image signal into the contour-emphasizing circuit 6.

If the input signal level of the image signal is smaller than the above-mentioned predetermined value, the voltage difference between the base and emitter of the transistor Tr1 decreases and the transistor Tr1 is turned off, whereby the base voltage of the output transistor Tr2 becomes equal to the input voltage. In this case, the degree of the rise of the image signal level of the base to the rise of the inputted image signal level is increased by turn-off of the transistor Tr1 and is larger than in the case where the inputted image signal level is high.

In the case where the image signal inputted from the MIX amplifier 4 is reversed, the level-correcting circuit 5 is constructed as shown in FIG. 2(B).

The relation between the output signal obtained by correcting the image signal and the input signal before the correction is as shown in FIG. 3, and in the dark region where the level of the image signal is lower than the predetermined level, a signal corrected with a relatively high gain is outputted, and in the bright region where the level of the image signal is higher than the predetermined level, a signal corrected with a reduced gain is outputted (see FIG. 4A).

If the thus level-corrected image signal is outputted into the contour-emphasizing circuit 6, the contour-emphasizing circuit 6 extracts a contour signal (see FIG. 4B) having a level corresponding to the corrected image signal level and outputs a contour-emphasizing signal corresponding to said level. The outputted contour-emphasizing signal is added to the original R signal, G signal and B signal, and an appropriately contour-emphasized image signal (see FIG. 4C) is obtained.

As the result, in the dark region, a contour-emphasized signal having a high level is obtained to enhance the emphasizing degree, and therefore, an image having a clear contour, which is easily legible, can be obtained. In the bright region, the level of the contour-emphasizing signal is controlled to an appropriate level, and therefore, the emphasis of the contour does not becomes excessive, and a legible image can be obtained, as in the conventional technique.

Incidentally, a non-linear amplifier can be used for the level-correcting circuit, or in the bright region, the level compression correction can be made in two stages or multiple stages.

As is apparent from the foregoing description, according to the present invention, by adopting a structure in which an image signal is level-corrected non-linearly and the corrected signal is outputted into the contour-emphasizing circuit, in the dark region, the contour-emphasizing degree is increased by a contour-emphasizing signal having a high level, and therefore, an image having a sharp contour, which is easily legible, can be obtained. Furthermore, in the bright region, the emphasis of the contour is controlled to an appropriate level and a legible image can be obtained.

INDUSTRIAL APPLICABILITY

As is apparent from the foregoing description, the contour-emphasizing apparatus in a television camera according to the present invention is very effective for improving the quality of a photographed image in the television broadcasting.

What is claimed is:

1. A contour-emphasizing apparatus in a television camera, where a contour-signal is extracted from an image signal, the image signal having an image signal level, the image signal having a dark image region and a bright image region, and the contour-signal is emphasized and corrected according to the image signal level, said apparatus comprising:
    means for producing the image signal;
    a level-correcting circuit for receiving the image signal, correcting the image signal non-linearly to the image signal level to produce a corrected image signal, and outputting the corrected image signal;
    a contour-emphasizing circuit for receiving the corrected image signal, extracting the contour signal from the corrected image signal and outputting an emphasized contour signal; and
    means for adding the emphasized contour signal to the image signal to produce a contour-emphasized image signal;
    wherein said level-correcting circuit is configured for correcting the image signal in the dark image region by a first gain and correcting the image signal in the bright image region by a second gain, said first gain being greater than said second gain.

2. The contour-emphasizing apparatus according to claim 1, wherein:
    said level correcting circuit comprises means for correcting the dark image region of the image signal when the image signal has an image signal level of from 0% to about 50%; and
    said level correcting circuit comprises means for correcting the bright image region of the image signal when the image signal has an image signal level of from about 50% to 100%.

3. The contour-emphasizing apparatus according to claim 1, wherein:
    said level correcting circuit comprises means for correcting the dark image region of the image signal when the image signal has an image signal level of from 0% to about 60%; and
    said level correcting circuit comprises means for correcting the bright image region of the image signal when the image signal has an image signal level of from about 60% to 100%.

4. The contour emphasizing apparatus according to claim 2, wherein the camera comprises a lens and a photoelectric conversion circuit, the lens for receiving a light signal and the photoelectric conversion circuit for processing the light signal from the lens into electrical signals.

5. The contour emphasizing apparatus according to claim 4, wherein the means for producing the image signal comprises:
    an image processing circuit for receiving the electrical signals from the photoelectric conversion circuit and processing the electrical signals from the photoelectric conversion circuit into elementary color image signals, and
    an MIX amplifier for mixing the elementary color signals from the image processing circuit to form a combined image signal.

6. The contour emphasizing apparatus according to claim 5, wherein:
    the combined image signal from the MIX amplifier is corrected in the level correcting circuit; and the emphasized contour signal from the contour-emphasizing circuit is added to the elementary color image signals to produce the contour-emphasized image signal.

7. The contour emphasizing apparatus according to claim 6, wherein the level correction circuit comprises a non-linear amplifier.

8. The contour emphasizing apparatus according to claim 6, wherein the level correction circuit comprises means for image level compression correction for compressing image signal levels in the bright image region.

9. The contour emphasizing apparatus according to claim 3, wherein the camera comprises a lens and a photoelectric conversion zone, the lens for receiving a light signal and the photoelectric conversion zone for processing the light signal from the lens into electrical signals.

10. The contour emphasizing apparatus according to claim 9, wherein the means for producing the image signal comprises:
    an image processing circuit for receiving the electrical signals from the photoelectric conversion zone and processing the electrical signals into elementary color image signals, and
    an MIX amplifier for mixing the elementary color signals from the image processing circuit to form a combined image signal.

11. The contour emphasizing apparatus according to claim 10, wherein the combined image signal from the image processing circuit is corrected in the level correcting circuit and the emphasized contour signal is added to the elementary color image signals to produce the contour-emphasized image signal.

12. The contour emphasizing apparatus according to claim 11, wherein the level correction circuit comprises a non-linear amplifier.

13. The contour emphasizing apparatus according to claim 11, wherein the level correction circuit comprises means for image level compression correction for compressing image signal levels in the bright image region.

14. A contour emphasizing apparatus for a television camera, where a contour-signal is extracted from an image signal, the image signal having a dark image region and a bright image region and the image signal having an image signal level, and the contour signal is emphasized and corrected according to the image signal level, said apparatus comprising:
    means for producing the image signal; and
    contour-emphasizing means for receiving the image signal, altering the image signal in the dark image region by a first gain and altering the image signal in the bright image region by a second gain, and producing an emphasized contour signal, said first gain being greater than said second gain.

15. The contour-emphasizing apparatus according to claim 14, wherein said contour-emphasizing means comprises:
    a level-correcting circuit for receiving the image signal, correcting the image signal non-linearly to the image signal level to produce a corrected image signal, and outputting the corrected image signal; and
    a contour-emphasizing circuit for receiving the corrected image signal, extracting the contour signal from the corrected image signal and outputting an emphasized contour signal.

16. The contour-emphasizing apparatus according to claim 15, wherein:
    the dark image region of the image signal comprises an image signal having an image signal level, the dark image signal level having a lower limit and an upper limit, the lower limit being 0% and the upper limit being in a range of from 50% to 60%; and
    the bright image region of the image signal comprises an image signal having an image signal level, the bright image signal level having a lower limit being in a range of 50% to 60% and an upper limit being 100%.

17. The contour-emphasizing apparatus according to claim 16, further including means for adding the emphasized contour signal to the image signal to produce a contour-emphasized image signal.

18. The contour-emphasizing apparatus according to claim 17, wherein:
    the camera comprises a lens and a photoelectric conversion circuit, the lens for receiving a light signal and the photoelectric conversion circuit for processing the light signal from the lens into electrical signals;
    the means for producing the image signal comprises:
        an image processing circuit for receiving the electrical signals and processing the electrical signals into elementary color image signals, and
        an MIX amplifier for mixing the elementary color signals to form a combined image signal;
    the combined image signal is conducted to the level correcting circuit and the emphasized contour signal is added to the elementary color image signals to produce the contour- emphasized image signal; and
    the level correction circuit comprises one of:
        a non-linear amplifier, and
        means for image level compression correction for compressing image signal levels in the bright image region.

* * * * *